Patented June 23, 1931

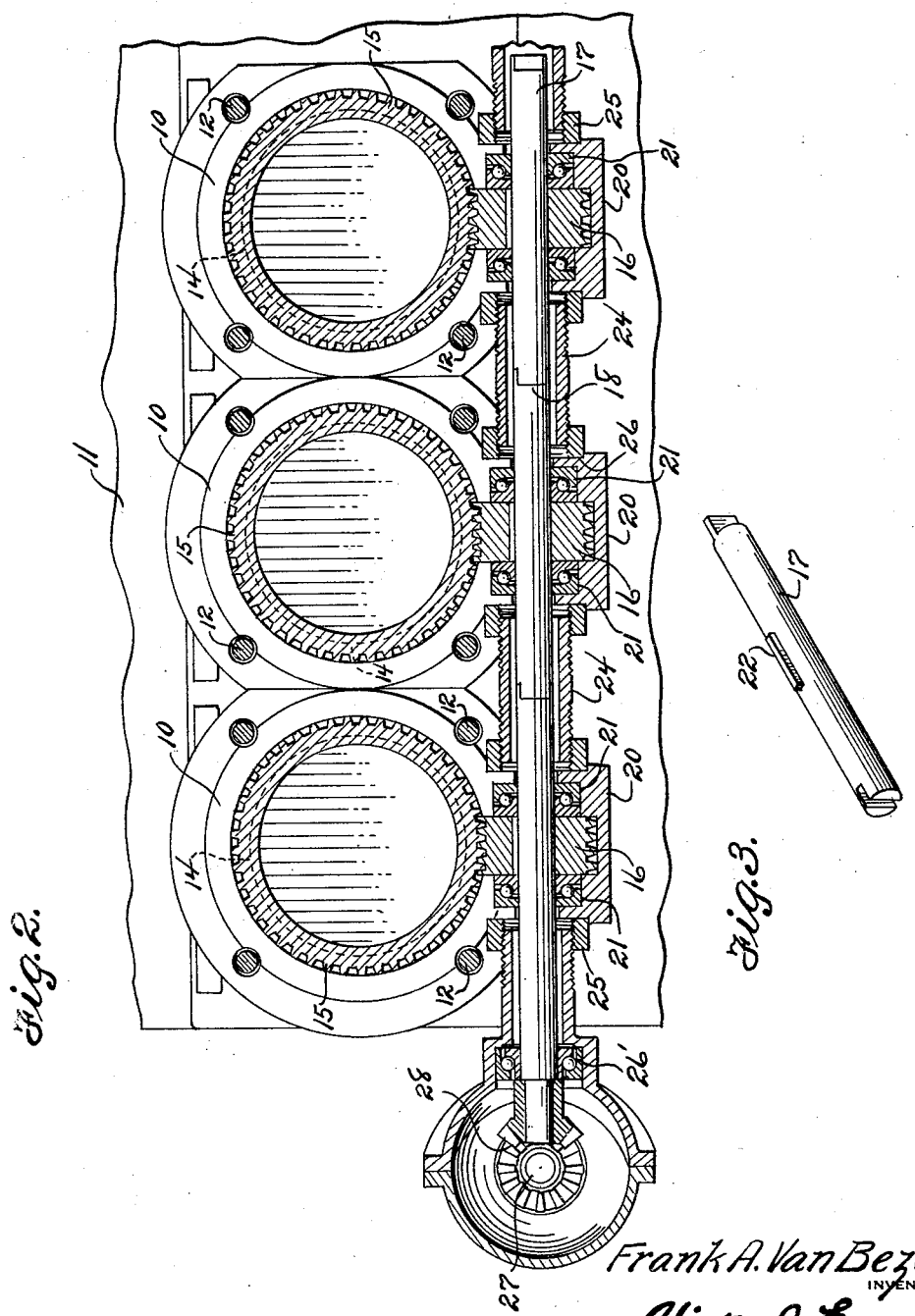

1,811,768

UNITED STATES PATENT OFFICE

FRANK A. VAN BEZEL, OF EL CENTRO, CALIFORNIA, ASSIGNOR TO DUAL AIRCRAFT MOTORS INC., LTD., OF EL CENTRO, CALIFORNIA

SLEEVE VALVE OPERATING SHAFT

Application filed July 11, 1930. Serial No. 467,357.

This invention relates to improvements in engines of the sleeve valve type, an object being to provide a shaft for the gears which rotate the sleeves, which includes a separate shaft section for each sleeve, and for so mounting the shaft that the sections, together with the gears and bearings, may be separately removed, so that the parts may be inspected and replaced without disturbing the gears of the remaining sleeve.

With the above and other objects in view, the invention further includes the following novel features and details of construction, to be hereinafter more fully described, illustrated in the accompanying drawings and pointed out in the appended claims.

In the drawings:—

Figure 2 is a section on the line 2—2 of Figure 1.

Figure 3 is a detail perspective view of one of the shaft sections.

Figure 1:
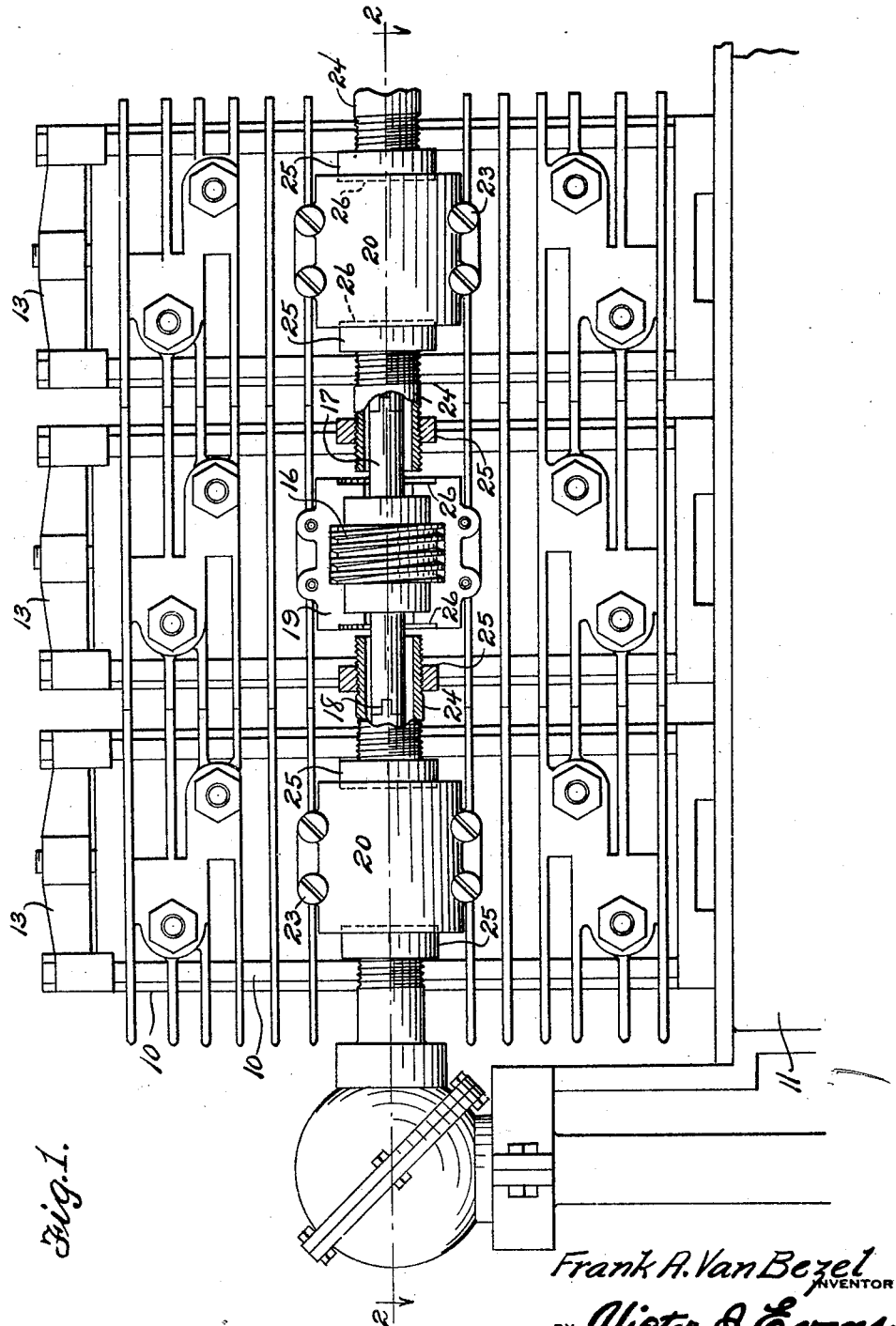
Figure 1 is a fragmentary elevation showing a portion of the engine with the invention applied.

Referring to the drawings in detail wherein like characters of reference denote corresponding parts, the reference character 10 indicates the cylinders of the engine which is of the air cooled type, the cylinders being removably mounted upon a base 11 and held in position by means of rods 12 and spiders 13. This structure forms the subject matter of an application filed by me of even date and bearing Serial No. 467,368.

In the said application, sleeves 14 extend throughout the length of the cylinders and are rotatable therein to cover and uncover ports for the admission of fuel and the discharge of exhaust gases. These sleeves are centrally surrounded by gears 15 which are engaged by worms 16 so that when the worms are rotated, the sleeves 14 will also be rotated.

As stated, the cylinders are removably mounted upon the base 11 and may be separately removed and in order to provide for the removal of the worm gears 16 and adjacent parts, the gears 16 are mounted upon separate shaft sections 17, one of these sections being provided for each gear 16. The shafts have an interlocking tongue and groove connection 18 so that they may be readily separated and connected.

The shaft sections 17 extend through housings 19 which are provided with removable caps 20 and these housings and caps accommodate anti-friction bearings 21 which are mounted upon opposite sides of the gears 16, while the latter are keyed to the shaft sections 17 as shown at 22. The caps are removably held in place by means of screws 23.

Connecting the opposed faces of adjacent housings are sleeves 24. These sleeves surround the connected ends of the shaft sections 17 and are provided at their opposite ends with extensions 25, the latter engaging the seats 26 at each end of the housings 19 and caps 20. These seats are ground so as to provide a tight contact with the extensions 25, and communication between these sleeves and the housings 19 may be had through the bearings 21 so that lubricant may pass from the housings into the sleeves and vice versa.

A bearing 26 is provided at one end of the sleeve and this end of the shaft 17 is geared to a shaft 27 through suitable gearing 28. The shaft 27 is driven from the crank shaft of the engine so as to drive the sectional shaft.

When it is desired to remove one of the gears 16, or the bearings 21, the threaded extensions 25 are backed off and disengaged from the housing. The cap 20 is then removed which will permit of the removal of the shaft section, its gear and bearings. The parts may thus be conveniently inspected and replacements may be readily made when necessary. In addition, the cylinder may be removed if desired, so that any or all of these parts may be removed and replaced without disturbing the adjacent parts.

By making the shaft of sectional formation, allowance is made for slight variations in alignment of the cylinders, so that binding of the shaft is prevented.

The invention is susceptible of various changes in its form, proportions and minor details of construction and the right is herein reserved to make such changes as properly fall within the scope of the appended claims.

Having described the invention what is claimed is:—

1. In an engine, cylinders, sleeves rotatable within the cylinders, gears carried by the sleeves, a shaft disposed transversely with respect to the cylinders and including a separate section for each cylinder, a gear mounted upon each section of the shaft and engaging one of the sleeve gears to rotate the sleeves when the shaft is rotated, means to rotate the shaft, means providing a detachable interlocking engagement between the shaft sections, removable bearings for the shaft sections, and a separate removable bearing housing for each section.

2. In an engine, cylinders, sleeves rotatable within the cylinders, gears carried by sleeves, a shaft disposed transversely with respect to the cylinders and including a separate section for each cylinder, a gear mounted upon each section of the shaft and engaging one of the sleeve gears to rotate the sleeves when the shaft is rotated, means to rotate the shaft, means providing a detachable interlocking engagement between the shaft sections, removable bearings for the shaft sections, and a cylinder carried housing including a removable cap for each shaft section, said housing enclosing the gear and bearings.

3. In an engine, cylinders, sleeves rotatable within the cylinders, gears carried by the sleeves, a shaft disposed transversely with respect to the cylinders and including a separate section for each cylinder, a gear mounted upon each section of the shaft and engaging one of the sleeve gears to rotate the sleeves when the shaft is rotated, means to rotate the shaft, means providing a detachable interlocking engagement between the shaft sections, removable bearings for the shaft sections, a cylinder carried housing including a removable cap for each shaft section, said housing enclosing the gear and bearings, and removable sleeves connecting the bearings and receiving the interlocked ends of the shaft sections.

4. In an engine, cylinders, sleeves rotatable within the cylinders, gears carried by the sleeves, a shaft disposed transversely with respect to the cylinders and including a separate section for each cylinder, a gear mounted upon each section of the shaft and engaging one of the sleeve gears to rotate the sleeves when the shaft is rotated, means to rotate the shaft, means providing a detachable interlocking engagement between the shaft sections, removable bearings for the shaft sections, a cylinder carried housing including a removable cap for each shaft section, said housing enclosing the gear and bearings, removable sleeves connecting the bearings and receiving the interlocked ends of the shaft sections, and extensions adjustably connected with opposite ends of the sleeves and engaging the bearings to provide a tight connection between the sleeves and bearing.

In testimony whereof I affix my signature.

FRANK A. van BEZEL.